(12) United States Patent
Zambonelli

(10) Patent No.: US 10,399,806 B2
(45) Date of Patent: Sep. 3, 2019

(54) WINDING APPARATUS AND METHOD

(71) Applicant: Manz Italy S.r.l., Sasso Marconi (IT)

(72) Inventor: Luca Zambonelli, Bologna (IT)

(73) Assignee: Manz Italy S.r.l. (IT)

(*) Notice: Subject to any disclaimer, the term of this patent is extended or adjusted under 35 U.S.C. 154(b) by 196 days.

(21) Appl. No.: 15/418,829

(22) Filed: Jan. 30, 2017

(65) Prior Publication Data

US 2017/0233205 A1   Aug. 17, 2017

(30) Foreign Application Priority Data

Feb. 15, 2016   (IT) ........................ 102016000015023

(51) Int. Cl.
| | |
|---|---|
| *B65H 18/10* | (2006.01) |
| *B65H 23/195* | (2006.01) |
| *B65H 23/198* | (2006.01) |
| *H01G 13/02* | (2006.01) |
| *H01M 10/04* | (2006.01) |
| *H01M 2/14* | (2006.01) |

(52) U.S. Cl.
CPC .......... *B65H 18/10* (2013.01); *B65H 23/198* (2013.01); *B65H 23/1955* (2013.01); *H01G 13/02* (2013.01); *H01M 2/145* (2013.01); *H01M 10/0404* (2013.01); *H01M 10/0431* (2013.01); *B65H 2301/414326* (2013.01); *B65H 2402/341* (2013.01); *B65H 2801/72* (2013.01)

(58) Field of Classification Search
CPC .............. B65H 18/10; B65H 2402/341; B65H 2301/414326; H01G 13/02
See application file for complete search history.

(56) References Cited

U.S. PATENT DOCUMENTS

| | | | |
|---|---|---|---|
| 5,312,064 | A | 5/1994 | Uesugi et al. |
| 2006/0123622 | A1 | 6/2006 | Guy |
| 2016/0036085 | A1 | 2/2016 | Choi et al. |
| 2017/0233205 | A1* | 8/2017 | Zambonelli ............ B65H 18/10 242/537 |

FOREIGN PATENT DOCUMENTS

| | | |
|---|---|---|
| EP | 2595233 A2 | 5/2013 |
| JP | H106168736 A | 6/1994 |
| JP | 2001233511 A | 8/2001 |
| JP | 2001243971 A | 9/2001 |
| JP | 2003146538 A | 5/2003 |
| JP | 2012051725 A | 3/2012 |
| KR | 20140015994 A | 2/2014 |
| WO | 2011141852 A1 | 11/2011 |

* cited by examiner

*Primary Examiner* — Sang K Kim
(74) *Attorney, Agent, or Firm* — Laubscher & Laubscher, P.C.

(57) ABSTRACT

It is described a winding apparatus for wrapping a material around a core of flat shape that rotates around a rotation axis rotating in its turn with a circular trajectory, controlling the laws of motion both of the core rotation around its axis and of the circular trajectory of its rotation axis, motor driven independently by means of electric cams, such as to cancel the variations of position and speed of the material at the entrance of the core The winding apparatus is used for producing electric energy accumulating devices.

14 Claims, 4 Drawing Sheets

WINDING APPARATUS AND METHOD

BACKGROUND OF THE INVENTION

The invention refers to a winding apparatus and method, in particular for winding material as tape, or stripe, or sheet.

Specifically, but not exclusively, the invention can be applied for producing electric energy accumulating devices.

The prior art comprises various winding apparatuses used for producing electric energy accumulating devices. In these apparatuses the winding core generally has oblong shape, non-circular, so that the movement of the material to be wound can be irregular and non-homogeneous. Several compensation systems have been proposed in order to make more regular and homogeneous the movement of the material being supplied to the winding core.

Patent publication EP 2595233 A2 describes an apparatus having a winding core, a compensation unit along axis Y to compensate the vertical movements of the entering tape and a compensation unit along axis X to compensate the variations of the tape speed due to the winding in order to maintain a uniform tension on the tape itself.

Patent publication KR 20140015994 A describes a winding apparatus having a rotating core with oblong shape and a tension regulation system that compensates the tension variations caused by the shape of the winding core through an alternate linear motion, with an auxiliary regulation unit provided with a swinging arm on which a tensioning roll is fixed.

Patent publication JP 6168736 A describes a winding apparatus and method for producing an electrodes body by moving the rotation centre of a plate along a circular trajectory.

Patent publication US 2006/0123622 A1 describes a device for manufacturing electric energy storing elements, with lamination rolls that laminate sheets, wherein laminated products are wrapped by a winding arrangement comprising a mandrel having a shaped profile and a pressing roll that touches it.

Patent publication JP 2001243971 A describes a winding device that avoids the oscillations of the winding speed of the sheet material, with a winding core having a non-circular section, a roll that rotates around a rotation axis and an arrangement for moving the position of the roll centre as a function of the rotation of the winding core.

Patent publication JP 2001233511 A describes a winding machine provided with a winding member rotating around a winding axis Z, with a rolling arrangement arranged for moving the winding axis Z, with a mechanism for adjusting the angular speed of the winding component and a mechanism for adjusting the angular speed of the rolling arrangement, to move the winding member according to a uniform linear motion keeping a uniform tension and avoiding winding speed oscillations.

Patent publication JP 2003146538 A describes a method and a winding device wherein a winding flat core is supported by a movable plate on a flat surface being perpendicular to the rotation axis of the winding core according to a horizontal direction and a vertical direction.

Patent publication JP 2012051725 A describes a winding device with a non-circular core for wrapping material, a motor driving in rotation the core and a mechanism for the transmission of motion from the motor to the core including toothed wheels configured in such a way that the speed of the rotating motion transmitted by the toothed wheels varies depending on the core angle.

Patent publication U.S. Pat. No. 5,312,064 A discloses a winding apparatus according to the preamble of claim 1.

SUMMARY OF THE INVENTION

A scope of the invention is providing a winding apparatus that permits a regular and uniform advancement of the material/s to be wound.

An advantage is realizing a winding apparatus with a compensation system that winds the material in a homogeneous way even though the rotatable core, around which the material is wound, has a non-circular shape.

An advantage is implementing a winding apparatus able to reduce oscillations and/or accelerations of the processed material/s.

An advantage is guaranteeing a constant and uniform tension of the material/s supplied to the winding apparatus.

An advantage is making available a winding apparatus adapted for producing electric energy accumulation devices.

An advantage is supplying a method for producing devices for accumulating electric energy of high quality with a high performance.

An advantage is providing a winding apparatus being simple and economic to be constructed and easily adaptable to changes of format, in particular change of size and/or shape of the winding core.

An advantage is wrapping with precision and reliability material/s on a winding core having a non-circular section.

An advantage is permitting the wrapping of the material/s on a non-circular core, as well as, if required, on a circular core.

Such scopes and advantages and some more are achieved by an apparatus and/or a method according to one or more of the hereinafter related claims.

In one example, an apparatus for winding material/s comprises a core having a non-circular shaped section that performs a winding motion around an axis being, in its turn, provided with a compensation motion with orbital trajectory, wherein the winding motion and the compensation motion are driven independently through two different electric cams, one controlling the winding motion and the other one controlling the compensation motion.

The two electric cams are programmed by two laws of motion, one for the winding motion and the other one for the compensation motion, configured to cancel (or in any case highly reduce) the variation of the position of the material/s at the core entrance and to cancel (or in any case highly reduce) the variation of the speed of the material/s at the core entrance.

BRIEF DESCRIPTION OF THE DRAWINGS

The invention shall be better understood and implemented referring to the enclosed drawings illustrating one example, without limitation, of implementation.

DETAILED DESCRIPTION

Figure 1:
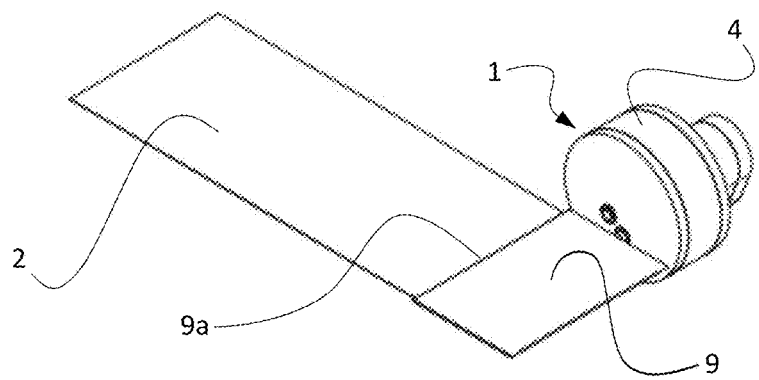
FIG. 1 is a perspective schematic view of a winding apparatus implemented according to the present invention.

By 1 it is indicated as a whole a winding apparatus, in particular for wrapping material/s 2 in form of tape, stripe, sheet, etcetera.

The winding apparatus 1 may be used, in particular, for producing an electric energy accumulating device, for example for wrapping a material 2 comprising at least one electrode (for example at least one electrode membrane) and/or at least one separator element for electrodes.

The winding apparatus 1 may comprise, in particular, a supplying arrangement (non-illustrated, for example of the prior art type) for supplying the material 2 along a supplying plane. Such supplying arrangement may comprise, for example, at least one reel for the material unwinding.

The winding apparatus 1 may comprise, in particular, a frame 3.

The winding apparatus 1 may comprise, in particular, a support 4 rotatably mounted on the frame 3 with the possibility of performing an orbital compensation motion (as will be better described hereinafter), in particular around a first rotation axis. The support 4 may be, in particular, rotatably coupled to the frame 3 interposing a first rolling support arrangement 5.

The winding apparatus 1 may comprise, in particular, a first motor axis 6 for driving the rotation of the support 4. The first motor axis 6 may be, in particular, rotatably supported by the frame 3, for example interposing a second rolling support arrangement 7. The first motor axis 6 may be, in particular, connected to the support 4 through a motion transmission arrangement, that may for example comprise a gear arrangement 8. The first motor axis 6 might not be coaxial with the said first rotation axis, as in this example.

The winding apparatus 1 may comprise, in particular, a core 9 with a non-circular shaped section on which the material 2 is wound. The shape of the product wrapped around the core 9 will be non-circular (because of the core shape). The core 9 may have, for example, a flat shape. The core 9 may have, for example, a rectangular shape section. The core 9 may have, for example, a foil shape. The core 9 may have, for example, an elliptic, oval, diamond shape, etcetera.

The core 9 may be rotatably mounted on the support 4 with the possibility of performing an orbital winding motion, in particular around a second rotation axis. The second rotation axis, in particular, might not be coaxial with the said first rotation axis. The core 9 may be rotatably coupled to the support 4 by means of the interposition of a third rolling support arrangement 10.

The winding apparatus 1 may comprise, in particular, a second motor axis 11 for driving the rotation of the core 9 around the second rotation axis. The second motor axis 11, in particular, may be coaxial with the said first rotation axis (rotation axis of support 4 with regard to frame 3).

The second motor axis 11, as in this example, may have a portion rotatably coupled to the frame 3 interposing a fourth rolling support arrangement 12. The second motor axis 11, as in this example, may have a portion rotatably coupled to the support 4 interposing a fifth rolling support arrangement 13.

The winding apparatus 1 may comprise, in particular, a mechanism 14 for transmitting the motion from the second motor axis 11 to the core 9. The mechanism 14 may comprise, as in this example, a gear arrangement. The mechanism 14 may comprise, as in this example, at least one toothed wheel 15 rotatably mounted on the support 4 with the possibility of rotating around a third rotation axis. The third rotation axis might not be coaxial with the said first rotation axis, as in this example. The third rotation axis might not be coaxial with the said second rotation axis, as in this example.

The toothed wheel 15 may be coupled, as in this case, to a toothed wheel 16 connected to the second motor axis 11 (for example coaxial with the first rotation axis). The toothed wheel 15 may be coupled, as in this case, to a toothed wheel 17 connected to the core 9 (for example coaxial with the second rotation axis).

The support 4 may be adapted, in particular, so as to provide a containing volume containing at least a part of mechanism 14. The support 4 may have, for example, a box shape. The support 4 may contain, in particular, toothed wheels 15, 16 and 17.

The frame 3 may have at least one portion adapted, in particular, so as to define a containment volume containing at least a part of the gear arrangement 8. Such portion of the frame 3 may have, for example, a box shape.

The motion transmitting arrangement (gear arrangement 8) may be distinct from the mechanism 14. In particular, the kinematic chain formed by the motion transmitting arrangement might not have, as in this example, parts in common with the kinematic chain formed by the mechanism 14.

The first motor axis 6 and the second motor axis 11 may be driven independently from each other. In particular, the first motor axis 6 and the second motor axis 11 may be rotated by, respectively, a first motor and a second motor different from the first one. The first motor and the second motor (not illustrated) may comprise motors of the known type (for example electric motors).

The winding apparatus 1 may comprise, in particular, a programmable electronic control arrangement 18 that may be provided, as in this example, with computer program instructions for controlling the first motor axis 6 with a first law of motion or rotation speed. The control arrangement may be provided, as in this example, with computer program instructions for controlling the second motor axis 11 with a second law of motion or rotation speed. The second law of motion may be different from the first law of motion. The first law of motion may have a non-constant rotation speed of the first motor axis 6. The second law of motion may have a non-constant rotation speed of the second motor axis 11.

The first law of motion and the second law of motion may be generated, as in this example, having as constraints at least two parameters comprising a position and a speed of a movable element involved in the winding process, for example a portion of the core 9 or a portion of the material 2.

A first parameter may comprise, for example, the position of the material 2 at an extremity 9a of the core 9, in particular the extremity 9a of the material entrance, that is the extremity 9a that receives, during the winding rotation, the material 2 being advancing (along the supplying plane) to be wrapped. The constraint may provide, for example, for the extremity 9a to remain always arranged on the supplying plane of the material 2 or near such plane during the winding process. A second parameter may comprise, for example, the speed of the material 2 at the extremity 9a (or the speed along the supplying plane of the material 2 to be wrapped). The constraint may provide, for example, for the speed of extremity 9a (or of the material 2 arranged on the extremity 9a of the core 9) to have always, during the winding process, a constant value (in direction and/or in absolute value) or, in any case, a value comprised within a defined variability range.

The winding apparatus may comprise, in particular, movement arrangement making the frame 3 perform a recovery motion (and consequently the support 4 and the winding core 9) in at least one direction that is transverse to the said supplying plane (in particular a vertical direction) in order to follow the progressive increase of volume of the product (material) being gradually wrapped around the core 9, so as to make the compliance with the above mentioned constraints easier.

The winding apparatus 1 may be used, in particular, for implementing a method for the production of electric energy accumulating devices. The apparatus 1 might in fact be used for winding material comprising at least a separator element for electrodes and/or at least an electrode.

During the winding of the material 2 on the non-circular core 9 (flat), the winding core 9 rotates with a rotation speed that is controlled by an electric cam (that controls the second motor driving the second motor axis 11) around a rotation axis performing a trajectory T (circular, with radius R) with a speed controlled by another electric cam (that controls the first motor driving the first motor axis 6). The electric cams are configured in such a way that the entrance position of the material 2 (the position at the entrance of the core 9, at the core extremity 9a) is constant and in such a way that the advancement speed of the material 2 is constant.

The above described system, wherein the rotation of the core 9 around its rotation axis and the rotation of the rotation axis of the core 9 are driven independently from one another with two different motors, combined to the rotation controls through electric cams, permits to achieve the constancy of the entering position and speed of the material 2.

Figure 4:
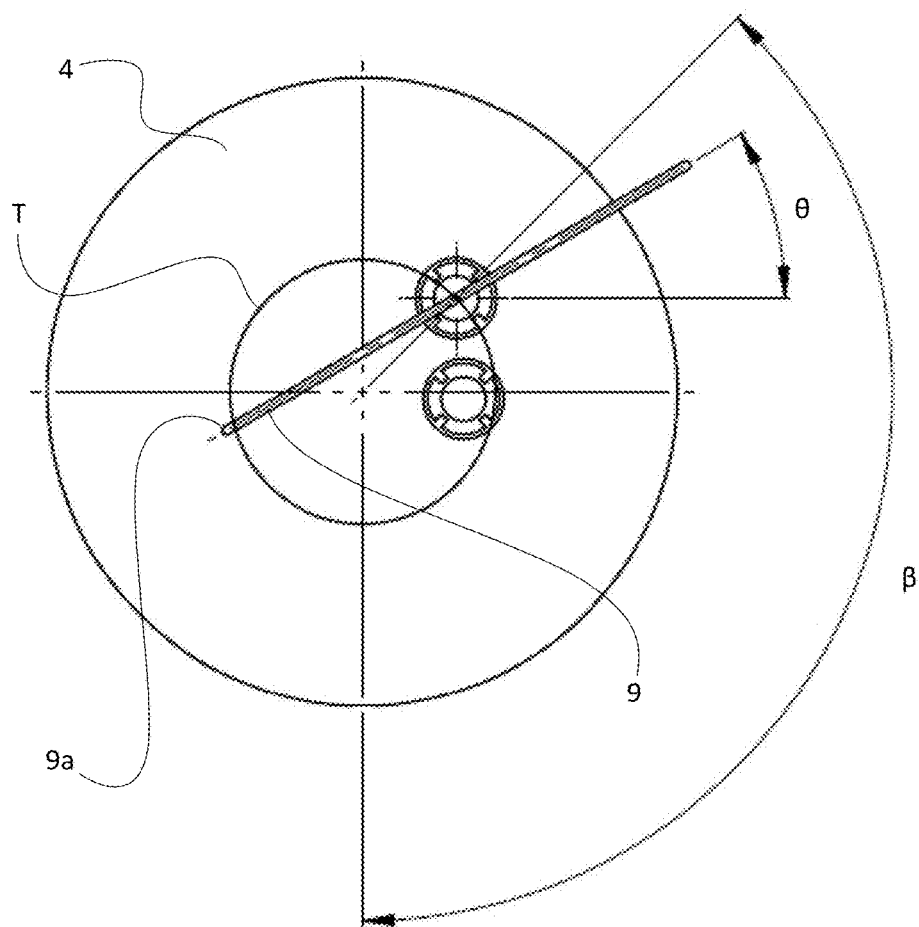
FIG. 4 is a view of FIG. 2 with the apparatus in a different configuration.
Figure 2:
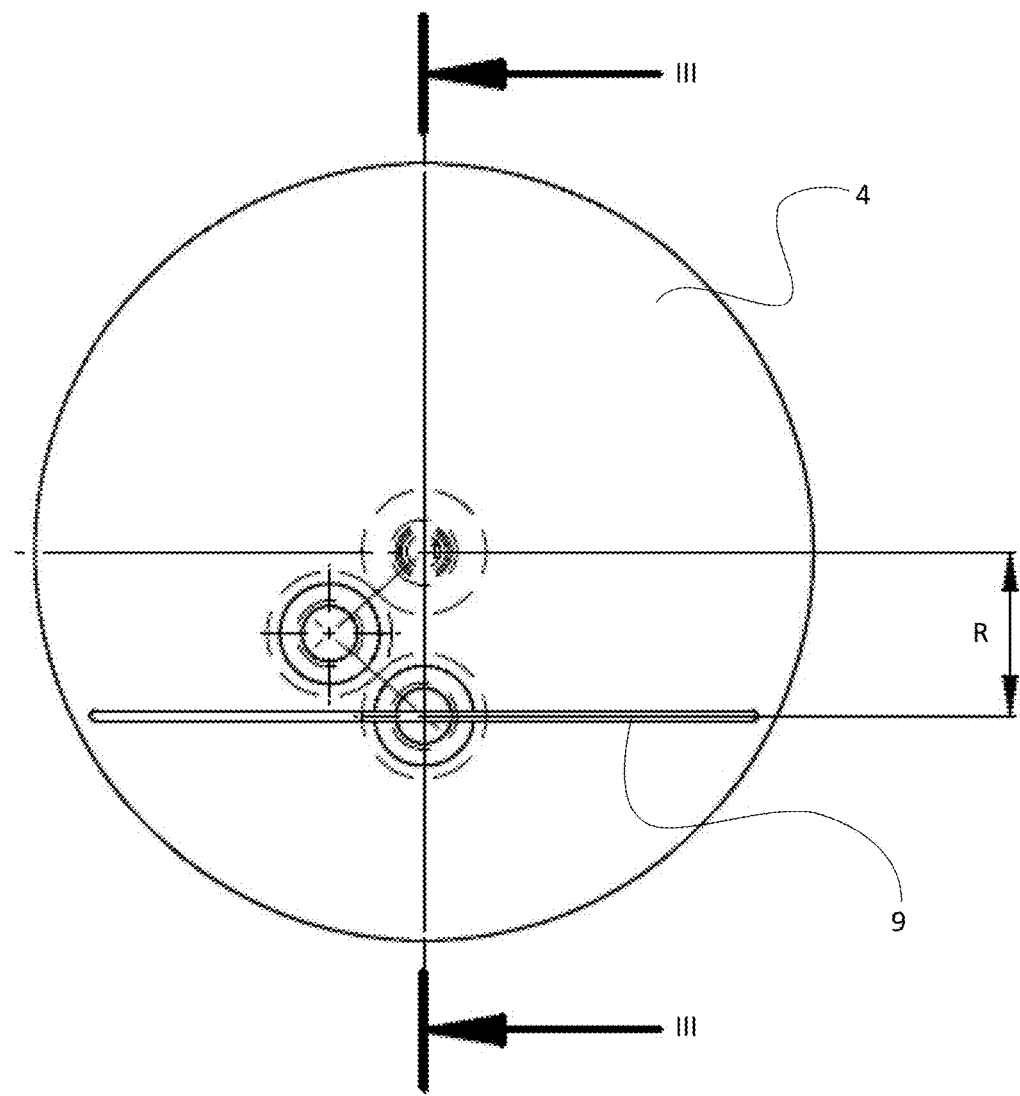
FIG. 2 is a front view of the apparatus of FIG. 1.
Figure 3:
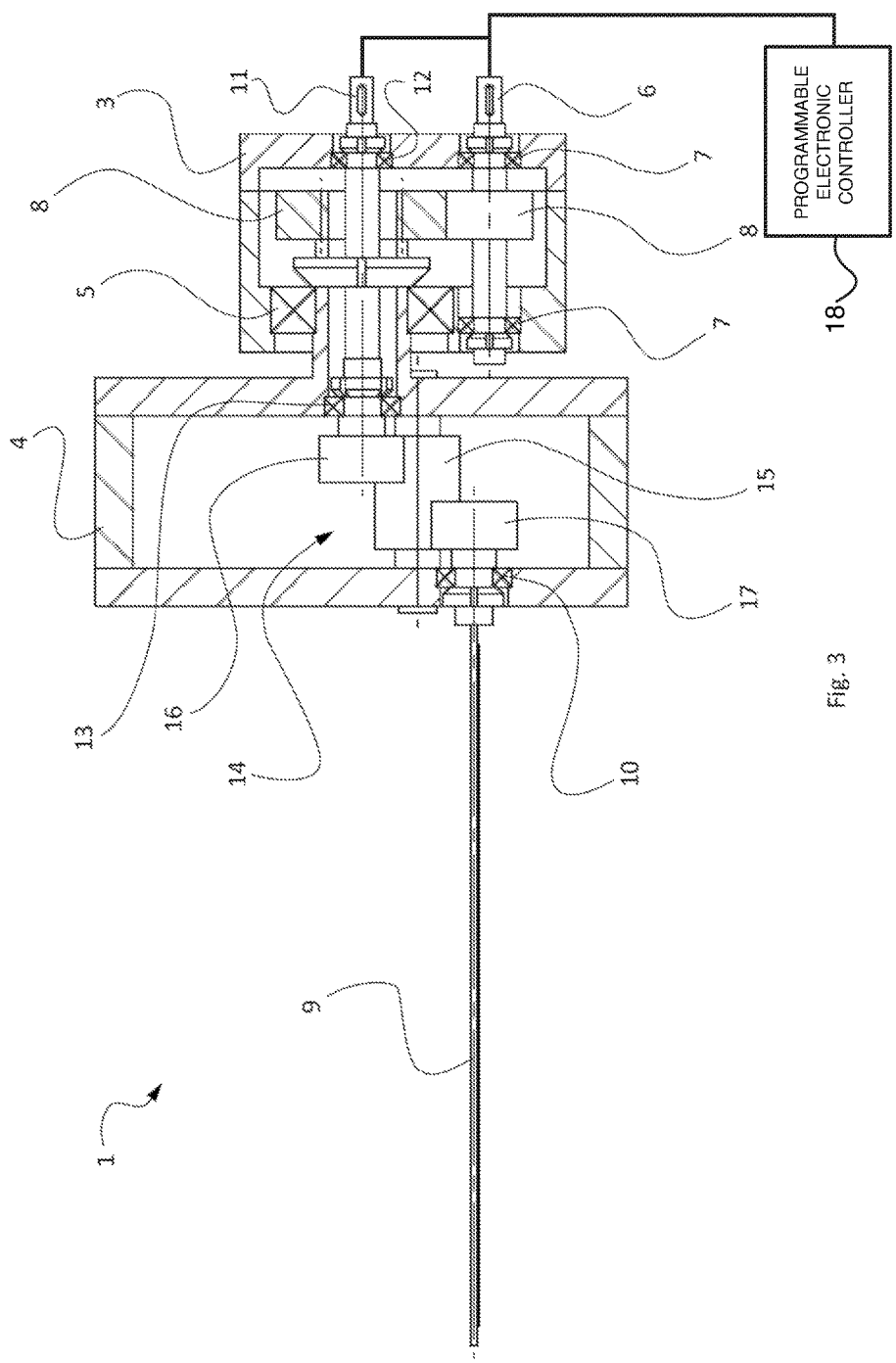
FIG. 3 is section III-III of FIG. 2.

The first motor axis 6 generates the compensation motion, that is an angular movement of the angle β (beta), with orbital trajectory T (being in particular circular, with radius R, see FIG. 2) of the support 4 (and of the rotation axis of the core 9 mounted on the support 4), while the second motor axis 11 generates the winding motion, that is an angular movement of the angle θ (theta), or rotation of the core 9 around itself around the second rotation axis. The angle θ (theta) and angle β (beta) are illustrated, for example, in FIG. 4.

As said, the second motor axis 11 (coaxial with the rotation axis of the support 4) controls the winding core 9 through a wheel 15 (idle), being in its turn connected with the rotating support 4. This allows to decouple the compensation motion (that is the rotation axis motion of the core 4 with circular trajectory T) and the winding motion (that is the rotation of core 9 around its own rotation axis), so that the driving of the first motor axis 6 can control only the compensation motion and the driving of the second motor axis 11 can control only the winding motion. The first motor axis 6 can control only the angle β (beta) variation and the second motor axis 11 can control only the angle θ (theta) variation.

The variations of position and speed of advancement of the material 2 at the entrance of the core 9 are cancelled through the electric cams that control the driving of the first and of the second motor axis 6 and 11. The laws of motion of the electric cams may be generated iteratively by taking as process constraints the entrance position and the speed of advancement of the material 2, calculating at any given time the angular position θ (theta) of the winding core 9 and the angular position β (beta) of the rotating support 4 in order to comply with the imposed constraints.

Figure 5:
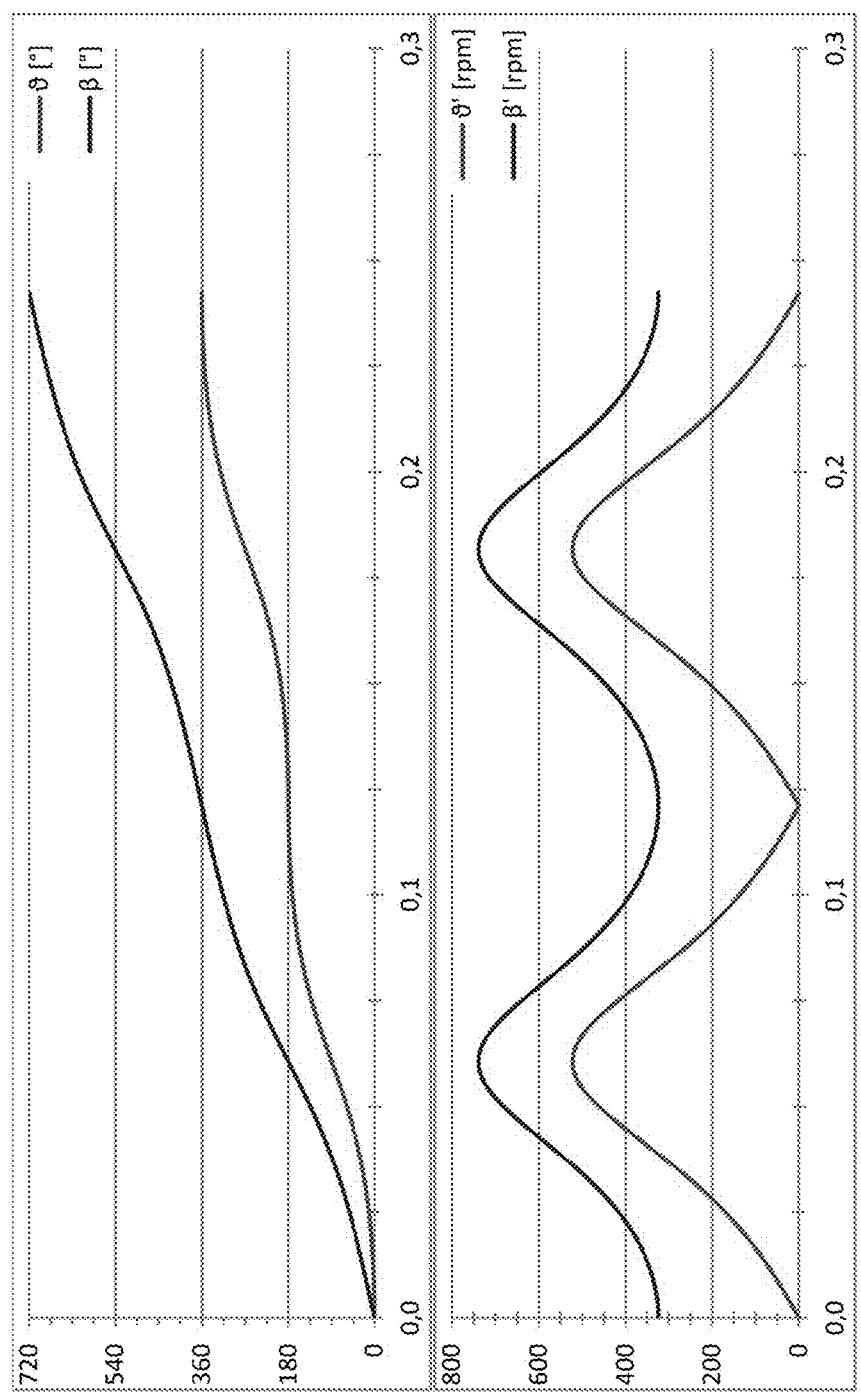
FIG. 5 shows the diagrams, as a function of time, of the angular movement and of the angular velocity of angles θ (theta) and β (beta) of FIG. 4.

The diagrams reported on top of FIG. 5 show the trends of the angle positions of the rotating winding core 9 (angle θ (theta)) and of the compensation rotating support 4 (angle β (beta)) for a single winding revolution (rotation of 360° of the core 9) in an example of winding process, as a function of time (in seconds). The diagrams reported at the bottom of FIG. 5 show the trends of the rotation speeds of the winding core 9 (speed θ' (theta')) and of the compensation rotating support 4 (speed β' (beta')) for the same winding rotation (in seconds). It is noticed that for each rotation of the winding core 9 (rotation of 360° of the core 9 around itself) two rotations of the rotation axis of the core on the compensation trajectory T are foreseen (rotation of 720° of the support 4).

The control of the motor axis 6 and 11 through the electric cams will take into account the presence of the transmission mechanisms and of possible transmission ratios between motor axis 6 and 11 and rotation axis of the core 9 and of support 4.

As said, the above described compensation mechanism may be connected to a movement system (for example linear translation, in particular in a direction that is perpendicular to a supplying plane of the entering material 2) to compensate time by time, during the revolutions that follow the first one, the gradual increase of size of the core 9 due to the accumulation of the wrapped material. The supplying plane may be horizontal and the translation may be vertical.

The invention claimed is:

1. A winding apparatus comprising:
   a frame;
   a support mounted on said frame for rotatable motion around a first rotation axis;
   a first motor axis for rotating said support;
   a core on which to wrap material;
   wherein said core is mounted on said support for rotatable motion around a second rotation axis that is not coaxial with said first rotation axis and wherein said apparatus comprises a second motor axis for rotating said core, said first motor axis and said second motor axis being driven independently of one another.

2. The apparatus according to claim 1, wherein said second motor axis is coaxial with said first rotation axis.

3. The apparatus according to claim 1, comprising a material supplying arrangement for supplying material in a supplying plane and a movement arrangement for moving said frame in at least one direction that is transverse to said supplying plane to take account, during winding, of the accumulation of material wrapped around the core.

4. The apparatus according to claim 1, wherein said core is of non-circular shape.

5. The apparatus according to claim 1, comprising a programmable electronic control arrangement provided with computer program instructions for controlling said first and said second motor axis with first and second rotation speeds, respectively, that are different from one another.

6. The apparatus according to claim 5, wherein at least one of said first and second rotation speeds is a non-constant rotation speed.

7. The apparatus according to claim 5, wherein said first and second rotation speeds are generated having as constraints at least two parameters comprising at least one position of a portion of the core or of a portion of the material and at least one speed of a portion of the core or of a portion of the material.

8. The apparatus according to claim 1, wherein said first motor axis is not coaxial with said first rotation axis.

9. The apparatus according to claim 1, wherein said second motor axis has a portion that is rotatably coupled with said frame and a portion that is rotatably coupled with said support.

10. The apparatus according to claim 1, comprising at least one mechanism for transmitting the motion from said second motor axis to said core.

11. The apparatus according to claim 10, wherein said support is shaped so as to define a containing volume that contains at least one part of said mechanism.

12. The apparatus according to claim 10, comprising a motion transmitting arrangement for transmitting the motion from said first motor axis to said support, said motion transmitting arrangement being distinct from said mechanism.

13. The apparatus according to claim 10, wherein said mechanism comprises at least one toothed wheel that is rotatably mounted on said support around a third rotation axis that is not coaxial with said first rotation axis and is not coaxial with said second rotation axis.

14. A method for producing electric energy accumulating devices using a winding apparatus according to claim 1 to wind at least one of an electrode and a separator.

* * * * *